United States Patent
Bahder et al.

[15] 3,707,674
[45] Dec. 26, 1972

[54] METHOD AND APPARATUS FOR MEASURING CORONA INCEPTION VOLTAGE ON OVERHEAD CONDUCTORS AND THE LIKE

[72] Inventors: George Bahder, Edison; Felipe G. Garcia, Scotch Plains, both of N.J.

[73] Assignee: General Cable Corporation, New York, N.Y.

[22] Filed: April 5, 1971

[21] Appl. No.: 131,094

[52] U.S. Cl. .....................324/72, 324/54, 324/122
[51] Int. Cl. ................................................G01r 33/02
[58] Field of Search ............324/122, 54, 72; 330/70

[56] References Cited

UNITED STATES PATENTS 2,802,180  8/1957  Nye ........................................324/54
3,263,165  7/1966  Eigen .....................................324/54
3,430,137  2/1969  Eager ....................................324/54
2,890,420  6/1959  Bradburd ............................330/70
3,505,597  4/1970  Cronin ..................................324/72
2,965,755  12/1960  West ....................................324/54

Primary Examiner—Robert J. Corcoran
Attorney—Sandoe, Hopgood & Calimafde

[57] ABSTRACT

With this invention, corona inception voltage in uninsulated overhead lines is detected by placing a sensitive direct current galvanometer in position to detect the change from negative to positive space charge around the overhead conductor when corona discharge begins. The galvanometer, with low pass filters, is placed in series with the power line, and the low pass filters prevent the relatively heavy capacitive alternating current from flowing through the direct current galvanometer coil.

12 Claims, 6 Drawing Figures

METHOD AND APPARATUS FOR MEASURING CORONA INCEPTION VOLTAGE ON OVERHEAD CONDUCTORS AND THE LIKE

BACKGROUND AND SUMMARY OF THE INVENTION

Present methods for detecting corona inception in overhead lines are: visual detection, which is limited by the observer's visual acuity and by ambient lighting conditions; aural detection, which is limited by the observer's aural acuity and by ambient noise conditions; and power loss measurements, which are limited in usefulness because of their inability to sharply define the voltage of corona inception.

This invention takes advantage of the phenomena by which the continuous bombardment by cosmic rays of atmospheric gases produces positive and negative (electrons) ions in the atmosphere. When the voltage on an overhead line is below the level required for corona inception, the alternating electric field in the vicinity of the line causes the ions to drift. The electrons, due to their low mass, quickly escapes the field, and a net positive space charge is left in the vicinity of the line.

This positive space charge decreases the field strength at the conductor during positive half cycles of the supply voltage, and increases the field strength during negative half cycles, causing a net negative flow of current that can be measured by a DC galvanometer.

When the voltage is raised to the corona inception level, the corona penetrates the space charge layer and the positive discharge being stronger than the negative discharges, the current through the DC galvanometer is reversed. The deflection of the DC galvanometer is a function of the voltage.

The apparatus and method of this invention are more sensitive for measuring corona inception voltage than any presently known apparatus or methods. The invention sharply defines the corona inception threshold.

The system of this invention is totally independent of ambient sound and light conditions. It allows measurement of corona inception voltage independently of whether the discharges start at the conductor surface which may or may not be observed. The system is extremely insensitive to electrical noise; and it may be used on any length of line from a few feet to several miles. The system may be used during manufacturing process for continuous corona test, the Laboratory testing of short conductors, and the testing completed overhead lines.

The system of this invention may be used for testing of external corona on other high voltage equipment such as high voltage insulators, bushings, switch gears and high voltage busses.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views.

DESCRIPTION OF THE PREFERRED EMBODIMENT

Figure 1:
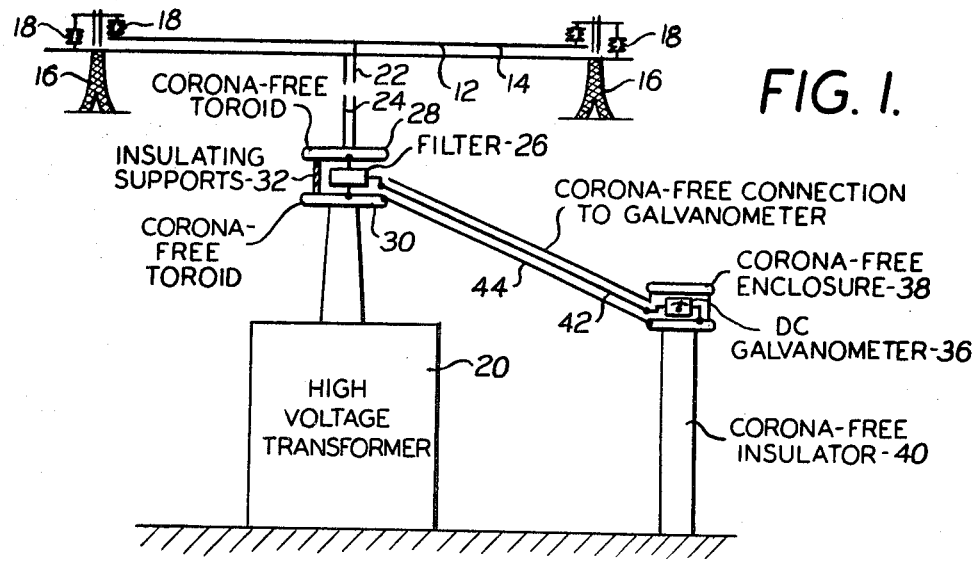
FIG. 1 is a diagrammatic view showing the invention applied to a transmission line.

FIG. 1 shows a power line comprising conductors 12 and 14 supported from towers 16 by insulators 18. A variable power source, shown in FIG. 1 as a high voltage transformer 20, is connected with the power line 12-14 by conductors 22 and 24.

The corona detection equipment includes a low pass filter 26 located in a corona-free space between toroids including an upper toroid 28 and a lower toroid 30. These toroids are spaced from one another by insulating supports 32, one of which is shown in FIG. 1, but it will be understood that there are others at angularly spaced locations around the toroid.

A direct current galvanometer 36 is connected in parallel with the filter 26 and may be located in the same corona-free space as the filter 26. However, in the construction illustrated in FIG. 1, the galvanometer 36 is at a location remote from the filter 26 and is located in a corona-free enclosure 38 between toroids such as shown for the filter 26. The corona-free enclosure 38 is supported on a corona-free insulator 40, and a conductor 42, which connects the galvanometer 36 with the filter 26, extends through a corona-free connection 44 between the spaces which contain the filter 26 and the galvanometer 36.

Figure 2:
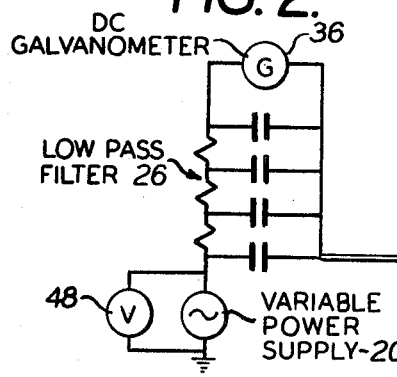
FIGS. 2 and 3 are wiring diagrams showing different ways in which the galvanometer can be connected with an overhead power line in which corona is to be detected.
Figure 3:
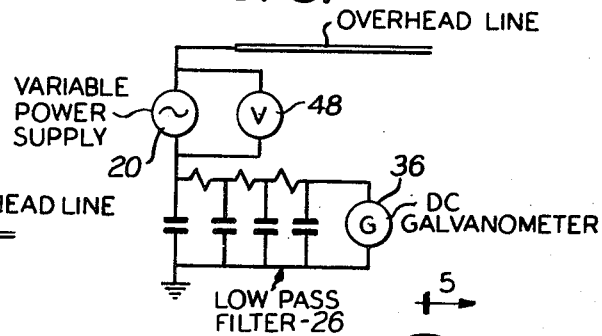

FIGS. 2 and 3 show wiring diagrams in which the low-pass filter 26 and the galvanometer 36 are connected with the power line and the variable power supply in different ways. In FIG. 2 the galvanometer and low-pass filter are connected with the high voltage side of the power supply 20; whereas in FIG. 3 the filter 26 and galvanometer 36 are connected with the ground side of the power supply 20. This latter arrangement is suitable if the power supply is corona-free.

In FIGS. 2 and 3 there is a voltmeter 48 connected across the variable power supply 20 for indicating the voltage when the galvanometer indicates corona inception. As long as the overhead cable power line 12 - 14 is operating below its corona inception voltage the net positive space charge in the atmosphere in the vicinity of the power line 12 - 14 causes a net negative flow of current through the galvanometer 36 as already explained.

When the voltage is raised to the corona inception level, or when there is damage to the line which reduces its corona inception level below the already existing voltage, the corona penetrates the space charge layer and the positive discharge being stronger than the negative discharges causes the current through the galvanometer 36 to reverse. This provides a sharp and definite indication of corona inception even though the corona has not yet reached a space where it is visible.

The purpose of the low-pass filters 26 is to prevent the alternating current in the line from flowing through the galvanometer coil. The alternating current cannot be filtered out of the galvanometer completely, and the only reason for filtering out most of the alternating current is not because it would give erroneous readings, but because if sufficiently heavy, it could burn up the delicate galvanometer coil.

The apparatus of this invention can be connected with the conductors for test purposes or it can be permanently connected with power lines for monitoring the power lines. The filter and galvanometer can be located in a generator station; or with the connection shown in FIG. 2, the filter and galvanometer can be located on a pole or tower that supports the power line provided that the galvanometer is suitably insulated from ground with corona-free insulators and provided the electrical connections for the galvanometer are themselves corona free. If the galvanometer is located on a pole or tower its reading can be observed with a telescope or other glass.

The insulators of a power line are normally part of any high voltage system and are, therefore, automatically included in a test of the circuit.

Figure 4:
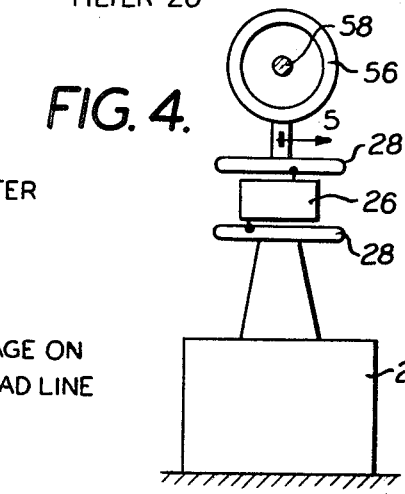
FIG. 4 is a diagrammatic view showing apparatus made in accordance with this invention and capable of detecting corona inception voltage in power cables during manufacture of the cable.
Figure 5:
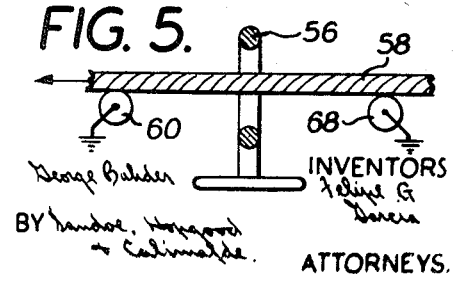
FIG. 5 is a sectional view taken on the line 5—5 of FIG. 4.

FIGS. 4 and 5 show the way in which the invention can be used for testing corona inception voltage during manufacture of a cable. In place of the high voltage line 12 − 14 of FIG. 1, a metal toroid 56 is mounted in a position in which a cable 58, in the course of being manufactured, can pass through the toroid 56 along the axis of toroid.

The cable is grounded by conductor wheels 60 which bear against the cable 58. 'he voltage of the supply is connected to the toroid 56 and is originally below the corona inception level of the air gap between the toroid and cable. An imperfection in the cable 58 which passes through the toroid 56 as the cable 58 advances longitudinally will ionize if the imperfection is of such a nature as to cause corona. This ionization can be indicated by the galvanometer connected with the circuit of FIGS. 4 and 5 in a manner similar to the connection through the overhead line and as shown in FIGS. 2 and 3.

Figure 6:
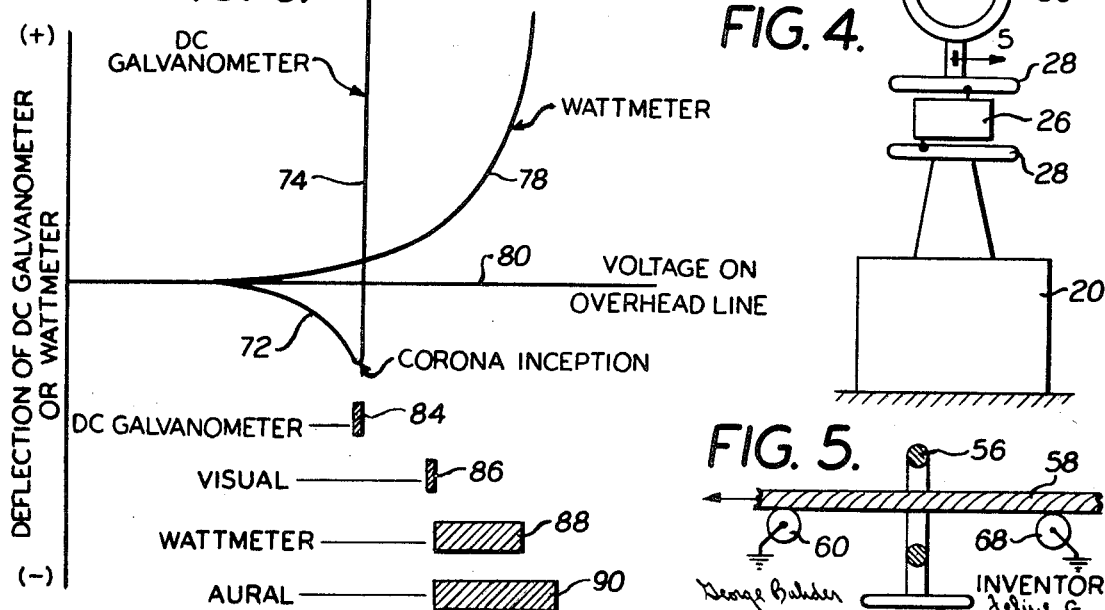
FIG. 6 is a graph showing comparison of the results obtained when detecting corona by this invention or by means of the prior art.

FIG. 6 is a graph with voltage of the overhead line 12 − 14 measured along the abscissa, and deflection of the galvanometer 36 measured along the ordinate. It will be apparent from FIG. 6 that the deflection of the galvanometer is negative and that it increases as the voltage in the overhead line increases as indicated by the current curve 72. At corona inception, the direction of the galvanometer deflection reverses abruptly and rises rapidly because when the net current becomes positive it increases as indicated by the current line 74 to a positive value sufficient to carry the galvanometer to its limit of deflection.

With prior art corona inception equipment that uses a Wattmeter, there is no reversal in the direction of the current indication by the Wattmeter. The reading of the Wattmeter increases at a progressively greater rate as the voltage on the overhead line increases but there is no sharp change in the curve 78 showing Wattmeter reading; and the exact voltage of corona inception cannot be determined.

The block diagrams under the abscissa 80 of the graph indicate the range within which various corona inception detection methods indicate corona inception. For example, with the galvanometer method of the present invention the corona inception is detected within a very narrow range as indicated by the width of the area 84 on the chart of FIG. 6. Corona inception detected by visual methods detects corona within a narrow range also as indicated by the width of the area 86, but this is not a satisfactory method because it depends upon whether the lighting conditions are such as to make the corona visible and considerable depends upon the skill and experience of the person watching for the corona. Also it is not likely to detect corona when it first starts because it must become severe enough to be visible before it can be detected by sight.

Use of Wattmeter corona inception methods produce results which vary over considerable range as indicated by the width of the area 88 of FIG. 6; and aural detection is even more indefinite and may vary over an even wider range as indicated by the width of the area 90 in FIG. 6.

The preferred embodiment of the invention has been illustrated and described, but changes and modifications can be made and some features of the invention can be used in different combinations without departing from the invention as defined in the claims.

What is claimed is:

1. The method of detection of corona of an electric circuit comprising locating at least a part of the circuit in a space having a positive space charge, impressing an alternating current voltage on the circuit less than the corona inception voltage, initially detecting the net negative flow in the circuit, upon said circuit providing a corona discharge detecting the change from negative to positive current flow caused by the corona discharge that creates a negative field that replaces the positive space charge, and detecting corona inception by change in current to a net positive flow.

2. The method of detecting corona described in claim 1 characterized by the circuit including an overhead cable and the positive space charge around the cable being produced by a continuous bombardment of cosmic rays of the atmospheric gases surrounding the cable to produce positive and negative (electrons) ions in the atmosphere where the alternating electric field of the cable causes drift of the ions with resulting escape of the low mass electrons leaving a net positive space charge at voltages below the corona inception voltage.

3. The method of detecting corona described in claim 2 characterized by increasing the alternating current voltage on the overhead cable until the inception of corona discharge creates the negative field, detecting the change in the direction of net current flow by connecting a galvanometer in series with the cable and protecting the galvanometer from heavy capacitance alternating current by a low pass filter.

4. The method of detecting corona described in claim 1 characterized by detecting the net negative current flow and the subsequent net positive current flow on the ground side of a power source that supplies the alternating current voltage to the part of the circuit being tested.

5. The method of detecting corona described in claim 1 characterized by detecting the net negative current flow and the subsequent net positive current flow at a location between the circuit to be tested and a power source that supplies to the circuit the voltage that produces the corona.

6. An apparatus for determining corona inception of an electric circuit or a part thereof including in combination means for detecting the direction of net current flow when the voltage on the circuit is less than its corona inception voltage and at least a part of the circuit to be tested is surrounded by a positive space charge that causes a negative net current flow in the circuit, a source of alternating current at variable voltage that can be increased to a voltage in excess of the corona inception voltage of the circuit or the part thereof for which the corona inception voltage is to be determined, and a voltage-responsive device that indicates the existing voltage when corona discharge begins and the corona penetrates the space charge layer and changes the space charge layer with resulting changes in the space charge from positive to negative and thereby reverses the direction of net current flow.

7. The apparatus described in claim 6 characterized by the part of the circuit to be tested having an overhead power line with a positive space charge on the atmosphere surrounding the power line produced by the continuous bombardment by cosmic rays of the atmospheric gases surrounding the line to produce positive and negative (electrons) ions in the atmosphere where the alternating electric field of the cable causes drift of the ions with resulting escape of the low mass electrons leaving a net positive space charge layer around the power line.

8. The apparatus described in claim 7 characterized by poles by which the overhead line is supported, the means of detecting the direction of net current flow being a galvanometer, said galvanometer being supported at a location along the line in a position where the galvanometer can be read from the ground by a telescope or binoculars. WI 9. The apparatus described in claim 6 characterized by the means for detecting the direction of net current flow being a direct current galvanometer having a coil, and a low pass filter connected with the galvanometer and the power line for preventing the relatively heavy capacative alternating current from flowing through the coil of the direct current galvanometer.

10. The apparatus described in claim 9 characterized by the low pass filter including a plurality of capacitors forming a bank of capacitors that is in series with the power line, the individual capacitors being in parallel with one another and in parallel with the galvanometer, and inductances connecting the parallel capacitors with one another.

11. The apparatus described in claim 10 characterized by the means for detecting the direction of net current flow when the voltage on the circuit is less than its corona inception voltage being in series with the circuit and between said circuit and a source of alternating current voltage.

12. The apparatus described in claim 11 characterized by the means for detecting the direction of net current flow being on the ground side of the source of alternating current variable voltage.

* * * * *